US005547764A

United States Patent [19]

Blais et al.

[11] Patent Number: 5,547,764
[45] Date of Patent: Aug. 20, 1996

[54] METHOD OF PRODUCING PVOH COATINGS WITH ENHANCED PROPERTIES

[75] Inventors: Marcia Blais, Fairport, N.Y.; Anthony R. Knoerzer, Plano, Tex.

[73] Assignee: Mobil Oil Corporation, Fairfax, Va.

[21] Appl. No.: 361,934

[22] Filed: Dec. 22, 1994

[51] Int. Cl.$^6$ .................... B32B 15/08; B32B 27/08; B05D 1/36; C08F 28/02
[52] U.S. Cl. .................... 428/461; 428/513; 428/518; 428/688; 427/407.1; 526/331
[58] Field of Search .................... 428/461, 513, 428/518, 688; 427/407.1; 526/331

[56] References Cited

U.S. PATENT DOCUMENTS

| | | | |
|---|---|---|---|
| 2,130,212 | 9/1938 | Watkins | 260/2 |
| 2,333,796 | 11/1943 | Kenyon et al. | 260/73 |
| 2,362,026 | 11/1944 | Quist | 260/90 |
| 2,419,281 | 4/1947 | Noble | 260/90 |
| 2,897,092 | 7/1959 | Miller | 117/17 |
| 2,916,468 | 12/1959 | Yundt | 260/29.6 |
| 3,033,842 | 5/1962 | Holtschmidt | 260/91.3 |
| 3,099,646 | 7/1963 | Scardiglia et al. | 260/91.3 |
| 3,221,079 | 11/1965 | Harris | 260/844 |
| 3,232,916 | 2/1966 | Fogle | 260/91.3 |
| 3,275,575 | 9/1966 | Fogle | 260/2.2 |
| 3,282,729 | 11/1966 | Richardson | 117/138.8 |
| 3,294,577 | 12/1966 | Mayer | 117/138.8 |
| 3,518,242 | 6/1970 | Chrisp | 260/91.3 |
| 4,154,912 | 5/1979 | Philipp et al. | 526/7 |
| 4,224,262 | 9/1980 | Baird, Jr. et al. | 264/22 |
| 4,240,993 | 12/1980 | Sun | 264/22 |
| 4,254,169 | 3/1981 | Schroeder | 428/35 |
| 4,262,067 | 4/1981 | Philipp et al. | 429/139 |
| 4,272,470 | 6/1981 | Hsu et al. | 264/104 |
| 4,277,572 | 7/1981 | Fujiwara et al. | 525/61 |
| 4,284,671 | 8/1981 | Cancio et al. | 428/35 |
| 4,288,477 | 9/1981 | Bordini et al. | 428/35 |
| 4,357,402 | 11/1982 | Sheibley et al. | 429/206 |
| 4,376,183 | 3/1983 | Haskell | 524/417 |
| 4,416,938 | 11/1983 | Haskell | 428/289 |
| 4,475,241 | 10/1984 | Mueller et al. | 383/113 |
| 4,650,721 | 3/1987 | Ashcraft | 428/516 |
| 4,927,689 | 5/1990 | Markiewicz | 428/34.8 |
| 5,230,963 | 7/1993 | Knoerzer | 428/520 |

OTHER PUBLICATIONS

T. W. Modi, *Polyvinyl Alcohol*, in Handbook of Water-Soluble Gums and Resins 20.1–20.32 (Robert L. Davidson ed., 1980).

Harold L. Jaffe and Franklin M. Rosenblum, *Poly (Vinyl Alcohol) for Adhesives*, in Handbook of Adhesives 401–407 (Irving Skeist ed., 1990).

*Primary Examiner*—P. C. Sluby
*Attorney, Agent, or Firm*—Ronald A. Bleeker; Dennis P. Santini

[57] ABSTRACT

The present invention is a method of producing low oxygen-transmissive films having PVOH coatings through the utilization of a PVOH solution which includes at least two PVOH resins having differing degrees of hydrolysis. The present invention is also a low oxygen-transmissive film manufactured by this method.

32 Claims, No Drawings

METHOD OF PRODUCING PVOH COATINGS WITH ENHANCED PROPERTIES

BACKGROUND OF THE INVENTION

1. Field of the Invention

The present invention relates to films having poly(vinyl alcohol) coatings, and, more particularly, to enhancing the oxygen barrier properties and processing characteristics of cross-linked poly(vinyl alcohol) coatings.

2. Background of the Related Art

Poly(vinyl alcohol) coatings have been applied to various substrates in the past, and are known to provide a barrier to the transmission of oxygen. However, poly(vinyl alcohol) is soluble in water and as a result susceptible to attack by moisture. Various attempts have been made in the prior art to decrease the sensitivity of poly(vinyl alcohol) to moisture.

As known to those skilled in the art, poly(vinyl alcohol) (PVOH) is typically produced by hydrolyzing poly(vinyl acetate). Specifically, the acetate groups of poly(vinyl acetate) are replaced with alcohol groups through a hydrolysis reaction. The more acetate groups that are replaced, the greater the hydrolysis of the PVOH resin. For example, in a 95% hydrolyzed PVOH resin approximately 5% of the acetate groups remain unchanged. Similarly, in a 99% hydrolyzed PVOH resin, approximately 1% of the acetate groups remain unchanged.

One known method of decreasing the sensitivity of a PVOH coating to moisture is to cross-link the PVOH. For example, a cross-linking agent and catalyst may be applied along with the PVOH such that the agent interconnects and thereby cross-links the PVOH molecules as the coating dries. The catalyst is present to aid in the cross-linking process which otherwise may not occur without it.

Commonly owned co-pending Application Ser. No. 08/221,558, now abandoned discloses a polymeric substrate having a cross-linked layer of PVOH adhered thereto. The PVOH layer includes a cross-linking agent, such as melamine-formaldehyde or urea-formaldehyde, which cross-links the PVOH in the presence of an acid catalyst. The resultant film exhibits enhanced oxygen barrier characteristics, as compared to barrier films of the prior art.

Another method of decreasing the sensitivity and thereby fortifying the oxygen barrier characteristics of a PVOH coating is by utilizing a highly hydrolyzed PVOH resin. It is believed that the presence of more alcohol groups, i.e., greater hydrolysis, directly corresponds to better barrier properties and better moisture resistance. As a result, many of the PVOH coatings found in the prior art utilize PVOH resins having a degree of hydrolysis 98% or greater.

However, highly hydrolyzed PVOH resins have been found to create difficulties during application as a coating. Highly hydrolyzed PVOH resins exhibit a greater tendency to foam when pumped. Consequently, microscopic bubbles are created in the coating. This results in imperfections in the PVOH coating which may reduce the coating's moisture resistance and impermeability to oxygen.

Further, highly hydrolyzed PVOH resins exhibit a poorer "wet out" characteristic on a substrate as compared to the "wet out" exhibited using a less hydrolyzed PVOH resin. "Wet out" means the tendency of a coating to spread over a substrate. Highly hydrolyzed PVOH is less efficient during spreading than is less hydrolyzed PVOH.

Therefore, there is a need in the art for PVOH coatings which exhibit a high degree of oxygen impermeability and moisture resistance, while at the same time are easier to apply. Specifically, there is a need for PVOH coatings having the moisture resistance and high impermeability associated with highly hydrolyzed PVOH resins while, at the same time, possessing the lower foaming tendency and the better wet out associated with less hydrolyzed PVOH resins.

It is an object of the present invention to provide PVOH coatings which exhibit oxygen impermeability and moisture resistance associated with highly hydrolyzed PVOH resins, while at the same time, exhibiting lower foaming tendency and the better wet out associated with less hydrolyzed PVOH resins. It is also an object of the present invention to provide a low oxygen transmissive film utilizing this coating.

SUMMARY OF THE INVENTION

The present invention is a method of coating at least one side of a substrate with a PVOH solution which includes a blend of at least two PVOH components. The first PVOH component is a PVOH resin having a high degree of hydrolysis, preferably of at least about 98%. The second PVOH component is a PVOH resin having a low degree of a hydrolysis, preferably from about 80% to about 90%. The blend utilized in the present invention, preferably, has a ratio of the first component to the second component ranging from about 1:2 to about 20:1. A cross-linking agent and an optional catalyst may also be utilized with the present invention.

The present invention also includes a low oxygen-transmissive film manufactured by the method of the present invention.

As a result of the present invention, a new method of making a low oxygen-transmissive film, and a new low oxygen-transmissive film, are provided. The method and article of manufacture of the present invention provide a low oxygen-transmissive film which exhibits the impermeability and moisture resistance typically associated with highly hydrolyzed PVOH resins, and exhibits the improved processability typically associated with less hydrolyzed PVOH resins.

These and other advantages of the present invention will be appreciated from the detailed description and examples which are set forth herein to elucidate the understanding of the invention. However, it is not intended to in any way limit the scope of the present invention by the disclosure hereinbelow.

DETAILED DESCRIPTION OF THE INVENTION

It has now been discovered that a PVOH solution, which includes a blend of at least two PVOH resins having different degrees of hydrolysis, exhibits improved oxygen impermeability, moisture resistance and processability when applied as a coating in comparison to coatings utilizing either of the PVOH components by themselves. Specifically, the PVOH coatings utilized in the present invention exhibit an oxygen impermeability comparable to, if not better than, the PVOH coatings utilizing the highly hydrolyzed PVOH component alone. While at the same time, the PVOH solution of the present invention exhibits easier processability in the coating process through reduced foaming and a better wet out. The two processing characteristics are typically found in PVOH resins which have a low hydrolysis level normally precluding such resins from use as a barrier coating.

As previously mentioned, the first component of the PVOH blend utilized in the present invention is a PVOH resin having a high degree of hydrolysis. Preferably, the PVOH resins which are be utilized as the first component in the present invention have a hydrolysis level of at least about 98%. In other words, about 98% of the acetate groups of the poly(vinyl acetate) have been replaced with alcohol (OH) groups. In the most preferred embodiment of the present invention, a PVOH resin having at least about 99% hydrolysis is utilized.

The second component of the PVOH blend utilized in the present invention is a PVOH resin having a low degree of hydrolysis. This hydrolysis level ordinarily would normally preclude the use of these resins in a barrier coating. Preferably, a PVOH resin having a hydrolysis level of at least about 80% to about 90% is utilized. In a most preferred embodiment of the invention, a PVOH resin of about 85% hydrolysis is used.

It has been found that a blend of the two components in a ratio of about 1:2 to about 20:1, preferably from about 2:1 to about 5:1, and most preferably from about 2.5:1.0 to about 3.5:1.0, exhibit an increased oxygen impermeability in the applied coating while at the same time exhibit better processability. In most preferred embodiment of the present invention, the first component and the second component are in a ratio of about 2.5:1.0 to about 3.5:1.0 In other words, the PVOH resin blend is approximately 71%–78% of the highly hydrolyzed PVOH resin and 22%–29% of the lower hydrolyzed PVOH resin. Further, in another most preferred embodiment of the present invention, the two components of the blend are 71%–78% of a 99.3% hydrolyzed PVOH resin and 22%–29% of a 86% hydrolyzed PVOH resin.

The PVOH resins utilized as first and second component can range from low molecular weight resins to high molecular weight resins depending on the viscosity of the applied coating desired. Specifically, there is a direct relationship between the molecular weight of the PVOH polymer and the viscosity of the PVOH/water solution. PVOH resins having molecules of a high molecular weight also exhibit a high viscosity, and PVOH resins having low molecular weight molecules exhibit a lower viscosity. Preferably, the PVOH resins utilized in the present invention are those with a low molecular weight.

Also, as known in the art, a cross-linking agent and an optional catalyst can be utilized with the PVOH solution to facilitate cross-linking. It is contemplated that any of the cross-linking agent and catalysts known in the art can be utilized with the present invention. For example, the cross-linking agent can be a melamine-formaldehyde or an urea-formaldehyde resin. Commercially available cross-linkers include PAREZ 613, a methylated melamine formaldehyde; CYMEL 373, a methylated melamine formaldehyde; CYMEL 401, a trimethelol melamine urea formaldehyde; glyoxal; borax; and others. The catalyst, which is usually an acid catalyst, can be ammonium sulfate, ammonium chloride, ammonium nitrate, sulfuric acid or nitric acid. In a preferred embodiment of the present invention, the cross-linking agent is glyoxal which does not require the use of a catalyst. It has been found that by utilizing glyoxal as the cross-linking agent, the pot life of the PVOH solution is also increased.

The PVOH solution of the present invention, which includes a blend of at least two PVOH resins, is preferably an aqueous solution. The solution is prepared by adding the PVOH resins in the appropriate ratio to water at a sufficient temperature to dissolve the PVOH resins. The water and the dissolved PVOH are then cooled. The cross-linking agent and the optional catalyst are then added to the cooled solution. The resulting solution is then coated onto a substrate, which previously may have been treated with a primer to enhance adhesion of the PVOH coating thereto. In a preferred embodiment the aqueous PVOH solution includes from about 2% to about 20% by weight of solid and preferably, from about 4% to about 8% by weight of solid. This solid content is made up of about 20% to about 98% by weight of the PVOH resins in their various ratios, from about 2% to about 20% of a cross-linking agent and an optional catalyst.

The improved PVOH coatings of the present invention may be adhered to any number of substrates, including polymeric films, box boards, metallic films and paper. Preferably, the coating is adhered to a polymeric film such as a polyolefin. One particular preferred polyolefin is polypropylene.

To ensure that the PVOH coatings of the present invention properly adhere to a substrate, the substrate preferably includes at least one side that is adapted for receipt of the coating. Particularly, the side of the substrate to be coated should have surface properties which facilitate the securing of a PVOH layer thereto. For example, the side to be coated may be treated with a primer such as poly(ethyleneimine). However, other suitable primers may also be utilized. The side to be coated may also be adapted for subsequent receipt of a poly(vinyl alcohol) layer during formation of the substrate itself. For example, a polymeric substrate, e.g., polypropylene, may include a material such as maleic anhydride which improves the ability of poly(vinyl alcohol) to bond thereto. Finally, the substrate may be highly treated.

Once the coating is applied to the substrate, the coated substrate is passed through a drying oven. A typical drying oven heats the film from approximately 100°–130° C. As the film passes through the oven, the water in the applied coating is driven off which in turn increases the concentration of the solid content. At some point during the drying process, the cross-linking of the PVOH molecules is initiated. However, depending on the cross-linking agent and/or catalyst utilized, the amount of time for the coating to fully cross-link will vary. However, once the coating has fully cross-linked, the coated substrate (the resulting film) exhibits improved oxygen impermeability and moisture resistance.

EXAMPLES

The following examples illustrate the improved processability and the enhanced barrier characteristics of films produced by utilizing the PVOH solutions of the present invention.

Example I

In Example I, a control sample 1 was prepared using a PVOH solution containing 100% of a 99.3% hydrolyzed PVOH resin. Specifically, the PVOH resin utilized was Elvanol 71-30 which is commercially available from DuPont Chemical Co. Approximately 1220 grams of PVOH resin was dissolved in 11,540 grams of water ($H_2O$). 485 grams of glyoxal-40 was added to the solution. The solution was then applied to an orientated polypropylene (OPP) substrate using a reverse direct gravure coater. The resulting film was dried using a dry-air oven at 230° F. running at 125 feet per minute. The film was tested for oxygen transmission ($TO_2$), which is measured in cc/100-in$^2$/24 hr, on a Mocon Oxtran apparatus. Oxygen transmission rates at both 0% relative humidity (RH) and 75% RH were taken.

A substantial amount of foaming was observed during the applicating process. The large amount of air entrained in the solution made pumping the solution extremely difficult. Once the solution was pumped to the coater, the amount of foam was sufficient to overflow the coating pan and even come in contact with the substrate. The wet out of the applied coating onto the substrate was also not complete. The PVOH solution further exhibited a pot life of about one hour.

Example II

In Example II, control sample 2 was prepared using a PVOH solution containing 100% of a 86% hydrolyzed PVOH resin. Specifically, the PVOH resin utilized was Elvanol 52-22 manufactured by DuPont Chemical Co. Approximately 1040 grams of this PVOH resin was dissolved in 11,560 grams of $H_2O$. 485 grams of glyoxal-40 was added to the solution. The solution was then applied to an OPP substrate using a reverse direct gravure coater. The resulting film was dried using a dry-air oven at 230° F. running at 125 feet per minute. The film was tested for oxygen transmission at both 0% RH and 75% RH utilizing the apparatus described in Example I.

The PVOH solution exhibited a low amount of foaming as evidenced by the low amount of foam present in the coating pan. Further, the wet out of the applied coating onto the OPP substrate surface was substantially complete. Thus, the level of foam was very low and did not interfere with the coating process.

Example III

In Example III, test sample 3 was prepared in accordance with the present invention using a PVOH solution containing a blend of 50% of the 86% hydrolyzed PVOH resin and 50% of the 99.3% hydrolyzed PVOH resin. The blend was prepared by dissolving 490 grams of 86% PVOH resin and 490 grams of 99.3% PVOH resin in 11,540 grams of $H_2O$. 485 grams of glyoxal-40 was added to the solution. The solution was the applied to an OPP substrate and dried utilizing the same procedures as described in Example I. Oxygen transmission rates were also measured utilizing the apparatus described in Example I.

The amount of foaming observed was substantially less than the amount of foaming observed during the application of the solution in Example I. The level of foam was very low and did not interfere with the coating process. Similarly, the wet out exhibited by this PVOH solution was superior to the wet out observed in Example I.

Example IV

In Example IV, test sample 4 was prepared in accordance with the present invention using a PVOH solution containing a blend of 25% of the 86% hydrolyzed PVOH resin and 75% of the 99.3% hydrolyzed PVOH resin. The blend was accomplished by dissolving 244 grams of 86% PVOH resin and 732 grams of 99.3% PVOH resin in 11,540 grams of $H_2O$. 487 grams of glyoxal-40 was then added to the solution. The coating was applied to an OPP substrate, dried and oxygen transmission measurements taken utilizing the procedure described in Example I.

The amount of foaming observed was also substantially less than the amount of foaming observed in Example I. The level of foam was very low and did not interfere with the coating process. The wet out on the OPP substrate was also superior to the wet out observed in Example I. Lastly, the PVOH solution exhibited a pot life of about 72 hours.

COMPARATIVE TESTS RESULTS

The results from Examples I–IV are shown in Table I.

TABLE I

| | Hydrolysis Level | | Oxygen Transmission | |
|---|---|---|---|---|
| | | | 0% RH | 75% RH |
| Sample | 99.3% | 86% | (cc/100-in$^2$/24 hr) | |
| 1 | 100 | 0 | 0.032 | 1.62 |
| 2 | 0 | 100 | 0.430 | 3.00 |
| 3 | 50 | 50 | 0.054 | 1.99 |
| 4 | 75 | 25 | 0.018 | 1.30 |

As can be seen from Table I, surprisingly Test Sample 4, which utilized a PVOH solution containing a blend of the 99.3% and the 86% hydrolyzed PVOH resins in a ratio of 75% to 25% (3:1) exhibited the lowest rate of oxygen transmission, 1.30 cc/100-in$^2$/24 hr at 75% RH. This was quite unexpected because knowledge and experience in the art would have dictated that Control Sample I which utilized a PVOH solution containing 100% of the 99.3% hydrolyzed PVOH resin to have exhibited the lowest oxygen transmission rate. However, Control Sample I exhibited only a oxygen transmission rate of 1.62 cc/100-in$^2$/24 hr at 75% RH.

Furthermore, experience in the art would predict a theoretical average oxygen transmission rate for the blend of Test Sample 4 to be 1.97 cc/100-in$^2$/24 hr, ((0.75)($TO_2$ Control 1)+(0.25)($TO_2$ Control 2)). Quite unexpectedly, however, the oxygen transmission rate was a low 1.30 cc/100-in$^2$/24 hr. The blend of Test Sample 4 also exhibited better processability in terms of reduced foaming and a better wet out onto the substrate, in comparison to the solution of Control Sample 1.

Also surprisingly Test Sample 3, which utilized a PVOH solution containing a blend of the 99.3% and the 86% hydrolyzed resins in a 50% to 50% (1:1) ratio, exhibited an oxygen transmission rate of 1.99 cc/100-in$^2$/24 hr at 75% RH. This rate is comparable to the oxygen transmission rate of Control Sample 1 (1.62 cc/100-in$^2$/24 hr at 75% RH). In fact, knowledge in the art would have predicted Test Sample 3 to exhibit an oxygen transmission rate of about 2.31 cc/100-in$^2$/24 hr at 75% RH. This rate would be the theoretical average oxygen transmission rate expected utilizing a solution containing 1:1 PVOH blend of the 99.3% and 86% hydrolyzed resins, ((0.5)($TO_2$ Control 1)+(0.5)($TO_2$ Control 2)). The blend of Test Sample 3 also exhibited improved processability in terms of reduced foaming and a better wet out on the substrate, in comparison to the solution of Control Sample 1.

Thus, as demonstrated, the PVOH Solutions utilized for Test Samples 3 and 4 offer improvements in oxygen transmission, in addition to improvements in processability, over the PVOH solutions currently used in the art.

The PVOH solution for Test Sample 4 also exhibited a dramatic improvement in the pot life of the solution. The pot life of the solution for Control Sample 1 was relatively short, only about one hour. The pot life of the solution for Test Sample 4 was about 72 hours. Thus, the use of the PVOH blend increased the life of the prepared batch and will thereby reduce waste in the production of PVOH coated films due to the limited pot life of the PVOH solution.

While there have been described what are presently believed to be the preferred embodiments of the invention, those skilled in the art will realize that various changes and modifications may be made to the invention without departing from the spirit of such invention. All such changes and modification which fall within the scope of the invention are therefore intended to be claimed.

We claim:

1. A method of producing poly(vinyl alcohol) coated films having enhanced properties, comprising:

coating a substrate with a poly(vinyl alcohol) solution which includes a blend of at least two poly(vinyl alcohol) components, a first component being a poly(vinyl alcohol) resin having a hydrolysis level of at least about 98% and a second component being a poly(vinyl alcohol) resin having a hydrolysis level from about 80% to about 90% hydrolysis.

2. The method of claim 1, wherein said first component and said second component are in ratio of said first component to said second component ranging from about 1:2 to about 20:1.

3. The method of claim 2, wherein said first component and said second component are in a ratio of about 2:1 to about 5:1.

4. The method of claim 3, where said first component and said second component are in a ratio of about 2.5:1.0 to about 3.5:1.0.

5. The method of claim 1, wherein said first component is a poly(vinyl alcohol) resin having at least about 99% hydrolysis.

6. The method of claim 1, wherein said second component is a poly(vinyl alcohol) resin having at least about 85% hydrolysis.

7. The method of claim 1, wherein said first component is a low molecular weight poly(vinyl alcohol) resin.

8. The method of claim 1, wherein said second component is a low molecular weight poly(vinyl alcohol) resin.

9. The method of claim 1, wherein said poly(vinyl alcohol) solution further comprises a cross-linking agent.

10. The method of claim 9, wherein said cross-linking agent is glyoxal.

11. The method of claim 9, wherein said cross-linking agent is selected from the group consisting of melamine-formaldehyde, urea-formaldehyde, borax and derivatives thereof.

12. The method of claim 9, wherein said poly(vinyl alcohol) solution further comprises a catalyst to facilitate cross-linking.

13. The method of claim 12, wherein said catalyst is selected by group consisting of ammonium sulfate, ammonium chloride, ammonium nitrate, sulfuric acid, nitric acid and mixtures thereof.

14. The method of claim 1, wherein said substrate is selected from the group consisting of polymeric films, box boards, metallic films and paper.

15. The method of claim 14, wherein said polymeric film is an olefin.

16. The method of claim 15, wherein said olefin is polypropylene.

17. A low oxygen-transmissive film, comprising:

a substrate; and a coating applied as a blend of at least two poly(vinyl alcohol) components, a first component being a poly(vinyl alcohol) resin having a hydrolysis level of at least about 98% and a second component being a poly(vinyl alcohol) resin having a hydrolysis level from about 80% to about 90% hydrolysis.

18. The low oxygen-transmissive film of claim 17, wherein said first component and said second component are in a ratio of said first component to said second component ranging from about 1:2 to about 20:1.

19. The low oxygen-transmissive film of claim 18, wherein said first component and said second component are in a ratio of about 2:1 to about 5:1.

20. The low oxygen-transmissive film of claim 19, wherein said first component and said second component are in a ratio of about 2.5:1.0 to about 3.5:1.0.

21. The low oxygen-transmissive film of claim 17, wherein said first component is a poly(vinyl alcohol) resin having at least about 99% hydrolysis.

22. The low oxygen-transmissive of claim 17, wherein said second component is a poly(vinyl alcohol) resin having at least about 85% hydrolysis.

23. The low oxygen-transmissive film of claim 17, wherein said first component is a low molecular weight poly(vinyl alcohol) resin.

24. The low oxygen-transmissive film of claim 17, wherein said second component is a low molecular weight poly(vinyl alcohol) resin.

25. The low oxygen-transmissive film of claim 17, wherein said coating further comprises a cross-linking agent.

26. The low oxygen-transmissive film of claim 25, wherein said cross-linking agent is glyoxal.

27. The low-oxygen transmissive film of claim 25, wherein said cross-linking agent is selected from the group consisting of melamineformaldehyde, urea-formaldehyde, borax and derivatives thereof.

28. The low oxygen-transmissive film of claim 25, wherein said coating further comprises a catalyst to facilitate cross-linking.

29. The low oxygen-transmissive film of claim 28, wherein said catalyst is selected by group consisting of ammonium sulfate, ammonium chloride, ammonium nitrate, sulfuric acid, nitric acid and mixtures thereof.

30. The low oxygen-transmissive film of claim 17, wherein said substrate is selected from the group consisting of polymeric films, box boards, metallic films and paper.

31. The low oxygen-transmissive film of claim 30, where said polymeric film is an olefin.

32. The low oxygen-transmissive film of claim 31, wherein said olefin is polypropylene.

* * * * *